US012048955B2

(12) United States Patent
Price et al.

(10) Patent No.: US 12,048,955 B2
(45) Date of Patent: Jul. 30, 2024

(54) PRECISION REFRACTORY REMOVAL SYSTEMS AND METHODS

(71) Applicant: Hi-Tech Industrial Services, LLC, Deer Park, TX (US)

(72) Inventors: Ray Price, Deer Park, TX (US); Randy Mayes, Deer Park, TX (US); Ronald L. Nelson, II, Highlands, TX (US)

(73) Assignee: Hi-Tech Industrial Services, LLC, Deer Park, TX (US)

( * ) Notice: Subject to any disclaimer, the term of this patent is extended or adjusted under 35 U.S.C. 154(b) by 728 days.

(21) Appl. No.: 17/178,468

(22) Filed: Feb. 18, 2021

(65) Prior Publication Data

US 2021/0252565 A1 Aug. 19, 2021

Related U.S. Application Data

(60) Provisional application No. 62/978,065, filed on Feb. 18, 2020.

(51) Int. Cl.
*B08B 9/093* (2006.01)
*B08B 9/032* (2006.01)
*B08B 13/00* (2006.01)

(52) U.S. Cl.
CPC .......... *B08B 9/0936* (2013.01); *B08B 9/0321* (2013.01); *B08B 13/00* (2013.01); *B08B 2209/032* (2013.01); *B08B 2209/08* (2013.01)

(58) Field of Classification Search
CPC ..... B08B 9/0936; B08B 9/0321; B08B 13/00; F27D 1/16; F27D 2001/0046
USPC .......................................................... 266/281
See application file for complete search history.

(56) References Cited

U.S. PATENT DOCUMENTS 4,253,646 A * 3/1981 Goto .......................... C21B 7/06 266/271
4,328,959 A * 5/1982 Holtmann ............. F27D 1/1694 266/287
4,570,909 A * 2/1986 Hiroki ................... F27D 1/1636 266/271
5,601,051 A * 2/1997 Bajek ...................... B05B 13/04 118/308
7,128,074 B2 * 10/2006 MacNeil ................. B08B 9/051 134/22.12
8,794,712 B2 * 8/2014 MacNeil ................. B26F 3/004 299/17

* cited by examiner

*Primary Examiner* — Jessee R Roe
*Assistant Examiner* — Michael Aboagye
(74) *Attorney, Agent, or Firm* — Winstead PC

(57) ABSTRACT

An improved refractory removal system may provide a top, bottom, and nozzle assemblies. At least one of the top or bottom assemblies may provide a rotation mechanism that allows a nozzle or the nozzle assembly to be rotated about a central axis or axis of rotation. The system may provide one or more securing mechanism(s) that allow the system to be secured in a desired position of a refractory vessel that refractory material is to be removed from. The nozzle assembly may provide an axial actuation mechanism that allows the nozzle to be moved away or towards the central axis. The nozzle assembly may also provide a linear actuation mechanism that allows the nozzle to be moved up or down along the central axis. It shall be recognized that the system provides at least three degrees of motion to the nozzle, thereby allowing the system to be utilized for a variety of situations.

18 Claims, 13 Drawing Sheets

PRECISION REFRACTORY REMOVAL SYSTEMS AND METHODS

RELATED APPLICATIONS

This application claims the benefit of U.S. Provisional Patent Application No. 62/978,065, filed on Feb. 18, 2020, which is incorporated herein by reference.

FIELD OF THE INVENTION

This invention relates to refractory removal systems and methods. More particularly, to refractory removal systems and methods utilizing hydrodemolition.

BACKGROUND OF INVENTION

Refractory has long been an indispensable component of manufacturing and processing industries involving high heat. The critical nature of refractory linings for processing metal, glass, chemical, mineral, energy and ceramics, and various other materials highlights the importance of such linings. Periodically, refractory linings may require maintenance or even removal. However, removal of refractory linings is a very time consuming and laborious task. For example, heavy equipment, such as jackhammers, may be utilized in prior techniques to remove the refractory lining, as well as the need for an operator inside the vessel operating such equipment which had and greatly increased injury risk and reduced safety.

SUMMARY OF INVENTION

Embodiments of improved refractory removal systems discussed herein may include one or more of the following assemblies/mechanisms: top or bottom assemblies; securing or extension mechanism(s) for controlling extension arms; nozzle assembly providing and controlling the nozzle; linear actuator mechanism for controlling movement of the nozzle/nozzle assembly along a central axis; and axial actuation mechanism or controlling movement away/toward the central axis.

In one embodiment, an improved refractory removal system may provide top, bottom, and nozzle assemblies. At least one of the top or bottom assemblies may provide a rotation mechanism that allows a nozzle of the nozzle assembly to be rotated about a central axis or axis of rotation. The system may provide one or more securing/extension mechanism(s) that allow the system to be secured in a desired position of a refractory vessel that refractory material is to be removed from. The system may provide an axial actuation mechanism that allows the nozzle to be moved away or towards the central axis. The system may also provide a linear actuation mechanism that allows the nozzle to be moved up or down along the central axis. It shall be recognized that the system provides at least three degrees of motion to the nozzle, thereby allowing the system to be utilized for a variety of situations.

In yet another embodiment, an improved refractory removal system may provide a combined top and bottom assembly or single assembly. The assembly may provide a rotation mechanism that allows a nozzle of the nozzle assembly to be rotated about a central axis or axis of rotation. The system may provide one or more securing/extension mechanism(s) that allow the system to be secured in a desired position of a refractory vessel that refractory material is to be removed from. The system may provide an axial actuation mechanism that allows the nozzle to be moved away or towards the central axis. The system may also provide a linear actuation mechanism that allows the nozzle to be moved up or down along the central axis. It shall be recognized that the system provides at least three degrees of motion to the nozzle, thereby allowing the system to be utilized for a variety of situations.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
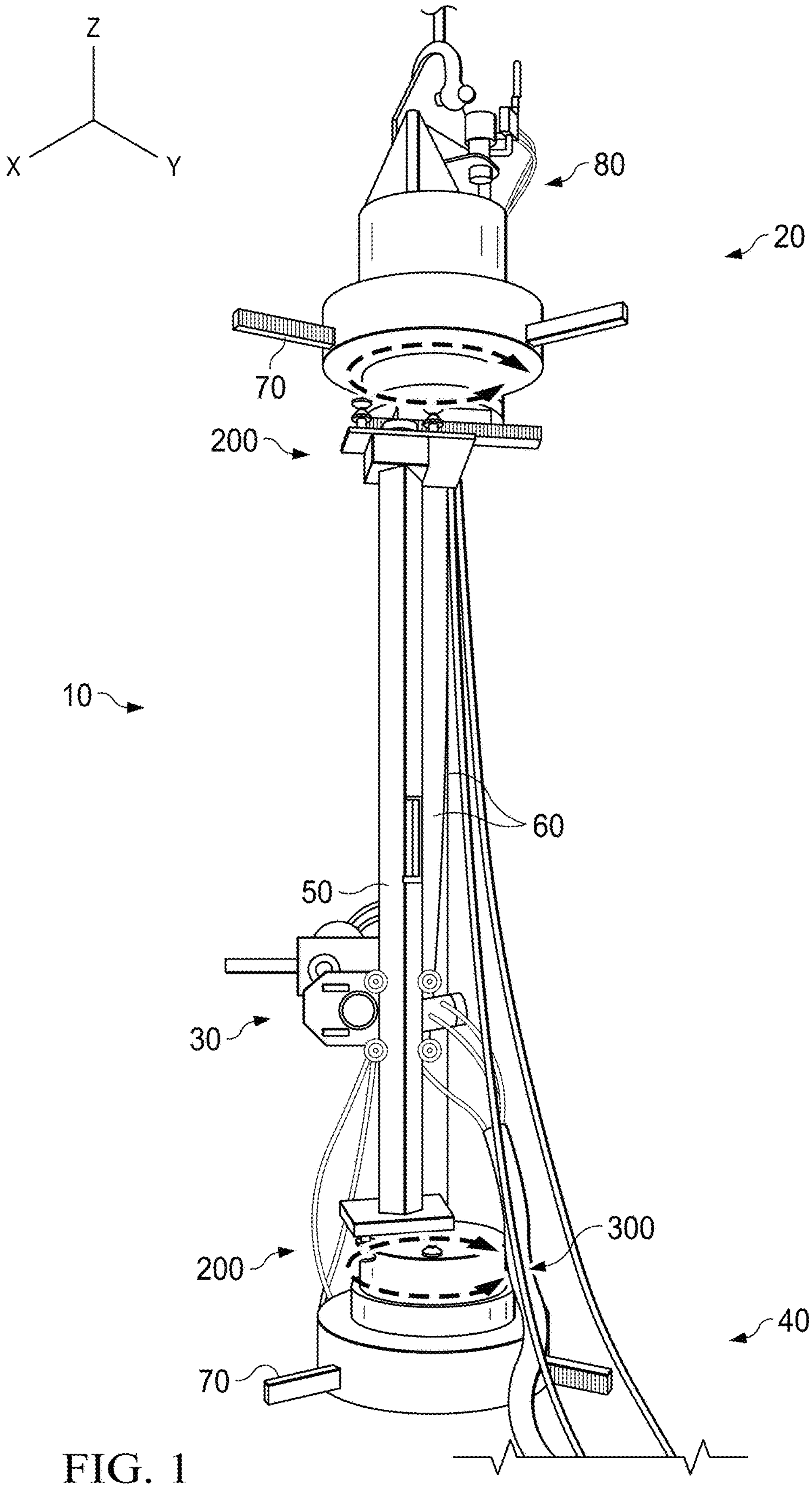
FIG. 1 is an illustrative embodiment of a refractory removal system.

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word “a” or “an” means “at least one”, and the use of “or” means “and/or”, unless specifically stated otherwise. Furthermore, the use of the term “including”, as well as other forms, such as “includes” and “included”, is not limiting. Also, terms such as “element,” “assembly,” or “component” encompass both elements, assemblies, or components comprising one unit and elements, assemblies, or components that comprise more than one unit unless specifically stated otherwise.

Refractory or refractory material is a material that withstands or minimizes decomposition by heat, pressure, abrasion, erosion, corrosive, and/or chemical attack. Refractory is often utilized as a refractory lining in various vessels utilized for various types of manufacturing or processing. The refractory lining may be secured to the vessel with an anchoring system. These refractory linings may be exposed to harsh temperatures, pressures, abrasion, erosion, corrosion, and/or chemicals when utilized for various types of manufacturing or processing, which may result in the need for maintenance and/or removal despite the refractory material’s resistance to such harsh conditions. Due to the properties of refractory materials, prior methods of removal is difficult and may require heavy equipment, chipping hammers, hydro-blast equipment as discussed previously. Further, prior methods may also require operator(s) inside refractory vessels during removal and present increased safety and injury risks.

Some methods have been explored regarding the possibility of hydro-demolition, commonly used in concrete removal, or the use of high-pressure and/or high flow water to remove refractory. However, these hydro-demolition systems have found it necessary to utilize high pressures and high flow to achieve acceptable removal of refractory. Further, such systems lack precision control of a water jet and cannot precisely control removal of refractory and positioning.

FIG. 1 is an illustrative embodiment of a refractory removal system 10 that allows refractory to be removed from a vessel or pipe in a precise manner. The refractory removal methods and systems discussed herein allow for removal of refractory materials from a vessel without the need for an operator inside the vessel. A typical refractory vessel or pipe may include a vessel of various shapes and/or sizes, such as a cylindrical, spherical, or any other shape tank, tubular, pipe, or the like, that is lined by refractory material. The refractory lining is held to the vessel via anchors welded inside. Hydro-demolition of the refractory lining often requires very high pressure (e.g. 20,000 PSI or greater) and/or high flow rates (e.g. 150 gallons/minute or greater).

The systems 10 discussed herein utilize very low pressures and/or flow rates. In some embodiments, the pressure utilized for removal of refractory materials may be 1,500 PSI or less. In some embodiments, the pressure utilized for removal of refractory materials may be 3,000 PSI or less. In some embodiments, the pressure utilized for removal of refractory materials may be 5,000 PSI or less. In some embodiments, the pressure utilized for removal of refractory materials may be 7,500 PSI or less. In some embodiments, the pressure utilized for removal of refractory materials may be 10,000 PSI or less. In some embodiments, the flow rate utilized for removal of refractory materials may be 40 gallons/minute or less. In some embodiments, the flow rate utilized for removal of refractory materials may be 50 gallons/minute or less. In some embodiments, the flow rate utilized for removal of refractory materials may be 75 gallons/minute or less. In some embodiments, the flow rate utilized for removal of refractory materials may be 100 gallons/minute or less. In some embodiments, the system may be modular to allow easy assembly, disassembly, and transport.

The refractory removal system 10 may provide three general assemblies or a top assembly 20, nozzle assembly 30, and bottom assembly 40. The refractory removal system 10 may be powered hydraulically, electrically, or a combination thereof. An external module (not shown) may provide pump(s), controller(s), processor(s), electric power, and/or the like. Generally, the external module is responsible for supplying fluid and electric power to system 10, as well as controlling operation of the system as desired. The external module may be coupled to various components of the refractory removal system 10 by various hydraulic cables, electric cables, and/or the like, and may direct fluid and/or power to desired locations to control operation as desired. In other embodiments, it may be possible to incorporate components of the external module into the system 10, such as providing controllers locally near one or more mechanism(s) of the system.

Each of the assemblies of system 10 may include several parts facilitating desired functionality discussed further herein. Further, the size and scale of the refractory removal system 10 may be modified as desired for any desired application. As a nonlimiting example, sizing may vary to allow use in tubulars (e.g. 32" or larger) or tanks (e.g. 4' or larger)—however, the system 10 may be scaled down or up to accommodate vessels of different sizes and shapes. Yet another nonlimiting example, sizing may be varied to accommodate vessels ranging 32" to 9' in size or shape. The top 20 and bottom 40 assemblies may be separated by a set or adjustable distance with the nozzle assembly 30, which may include a track bar 50 and support bar(s) 60. The top 20 and bottom 40 assemblies allow placement or securing the system 10 in a desired position in a vessel. In some embodiments, the vessel may be tubular or cylindrical. However, the system 10 may accommodate vessels of other shapes with suitable programming. At least a portion of the top 20 and bottom 40 assemblies may remain stationary when secured in the vessel, while the nozzle assembly 30 may rotate if desired. The top 20 and bottom 40 assemblies may provide two or more extension arms 70, which may be adjusted inward or outward from a central axis or axis of rotation of the system 10 as desired to secure the system in the vessel. Once secured by extension arms 70, portions of the top 20 and bottom assemblies remain stationary relative to the vessel. One or more of the top 20 and bottom 40 assemblies may provide a rotary mechanism 80 that allow the nozzle assembly 30 to rotate about a central axis or axis of rotation (e.g. z-axis). Where one rotary mechanism 80 is provided by the top 20 or bottom 40 assemblies, the other assembly may provide a bearing mechanism that allows the nozzle assembly 30 to rotate. The nozzle assembly 30 allows adjustment of a nozzle 100 directing fluid for cutting the refractory materials.

It should be noted that directional discussion of the system 10 is from a perspective where the system is oriented vertically. However, it shall be understood by one of ordinary skill in the art that the system 10 is not in any way limited to vertical operation and may operate in any orientation desired. The system 10 allows at least three degrees of motion or freedom for the nozzle assembly 30 or nozzle 100, such as rotation about the central axis (or yaw); adjustment away from the central axis and adjustment toward the central axis (back & forth and/or left & right); and/or up and down along the central axis or height adjustment. In some embodiments, the system 10 allows for adjustability for the nozzle assembly 30 or nozzle 100 of 360° or greater rotation about the central axis or axis of rotation. It is preferable to prevent repeated rotation in embodiments where lines (e.g. hydraulic and/or electric) are connected to rotating components to avoid wrapping the lines around the system. However, some embodiments may facilitate connection to stationary component(s) that do not interfere with rotation. In some embodiments, the system 10 allows the nozzle 100 to be adjusted up and down along the central axis or allows height to be adjusted. In some embodiments, the system 10 allows the nozzle 100 to be adjusted toward or away from the central axis or side-to-side/back-and-forward. In some embodiments, adjustability for the nozzle up and down along the central axis may range from 0 to 5 feet. In some embodiments, adjustability for the nozzle away from and towards the central axis may range from 0 to 8 feet. In some embodiments, the system 10 may provide further degrees of motion, including pitch, and/or roll adjustment for nozzle 100. In some embodiments, incorporation of a camera may be desirable as well. It may also be desirable to provide a protective housing and/or clean system, as the harsh environment and debris may obstruct the view or damage the camera. The camera may be positioned in any suitable location such as near the nozzle. Further detailed discussion of each of the assemblies of the system 10 is provided herein.

FIGS. 2-7 show various views of embodiments of a nozzle assembly 30. Components associated with the nozzle assembly 30 may include a nozzle 100, track bar 50, support bar(s) 60, main body 105, guides 110, and actuator 115. The nozzle 100 is secured to the main body 105 (e.g. via a bracket), which is movably coupled to the track bar 50. As shown, the main body 105 may also provide lines (e.g. hydraulic and/or electric) that control operation of nozzle 100. The track bar 50 and support bar(s) 60 separate the top 20 and bottom 40 assemblies, and provide sufficient structural support to the system to avoid damage during transport, use, operation, or the like. The track bar 50 also facilitates movement of the main body, such as discussed in further detail below.

The main body 105 may provide a linear actuation mechanism 90 that allows the main body to be moved up and down along the axis of rotation or central axis as desired (e.g. FIG. 2), such as along track bar 50. The linear actuation mechanism 90 may be implemented in a variety of ways and may comprise any suitable components, such as gearing, guide(s), actuator(s), motor(s), belt(s), chain(s), sprocket(s), hydraulic actuator(s), and/or the like. As a nonlimiting example shown, the linear actuation mechanism 90 may comprise track bar 50, guide(s) 110, actuator(s) 115, and gearing or a rack 120 and pinion. The track bar 50 may provide rack 120, whereas the rotatable pinion (not shown) is coupled to the actuator 115 of the main body 105 and may be rotated as desired to move the main body up or down along the rack. Actuator 115 may be hydraulically and/or electrically driven. Guides 110, which may rotate when the main body 105 is moved up or down, may secure the main body to the track bar 50 allowing smooth and precise movement up and down along the track bar. Further, guides 110 also keep the teeth of the rack 120 and pinion engaged. As a nonlimiting example, the guides 110 may be rollers with a v-shaped profile that compliment a square or rectangular profile of track bar 50—however, other shapes may be suitable for the guides and track bar. Preferably, at least two guides 110 are provided on opposite sides of the track bar 50. The maximum range that the main body 105 may move up and down is dependent on the length of track bar 50. In some embodiments, track bar 50 and/or support bar(s) 60 may optionally provide telescoping capabilities that allow their length to be adjustable. Adjustability for the nozzle up and down along the central axis depends on the size of the system. In some nonlimiting embodiments, adjustability for the nozzle up and down along the central axis may range from 0 to 5 feet or 0 to 8 feet. In some embodiments, the nozzle 100 may have the ability to oscillate back and forth along a desired axis (e.g. side-to-side) to improve removal of refractory. In some embodiments, the nozzle may have the ability to lance (e.g. point up or down slightly).

FIGS. 8-11 show various views of other portions of the nozzle assembly 30. In addition to allowing a nozzle 100 to be moved up or down along the central axis or axis of rotation, it is also desirable to allow the nozzle to be moved away or towards the central axis (e.g. FIG. 2). The system may provide one or more axial actuation mechanisms 200 that allow the nozzle 100 to be moved away or towards the central axis. The axial actuation mechanism(s) 200 may be implemented in a variety of ways and may comprise any suitable known components, such as gearing, guide(s), actuator(s), motor(s), belt(s), chain(s), sprocket(s), hydraulic actuator(s), and/or the like. As a nonlimiting example, the system 10 may provide two axial actuation mechanisms 200, each respectively positioned adjacent to top 20 and bottom 40 assemblies (e.g. FIG. 1). The track bar 50 may be coupled to the top 20 or bottom 40 assemblies via the axial actuation mechanism 200. As the top and bottom axial actuation mechanisms are very similar, it shall be understood that the features discussed may apply to both. Each axial actuation mechanism 200 may provide guide(s) 210, actuator(s) 215, gearing or a rack 220 and pinion 205, and axial bar 250. Each end of the track bar 50 may be secured to axial actuation mechanisms 200. The axial actuation mechanism 200 may provide an axial bar 250 with a rack 220 guiding movement towards or away from the central axis. Axial bar 250 and rack 220 are secured to the top 20 or bottom 40 assemblies. The axial bar 250 is coupled to the track bar 50 via guide(s) 210. Preferably, at least two guides 210 are provided on opposite sides of the axial bar 250. As a nonlimiting example, the guides 210 may be rollers with a v-shaped profile that compliment a square or rectangular profile of axial bar 250—however, other shapes may be suitable for the guides and axial bar. Additionally, the pinion 205 engages the rack 220 as well. Actuator or motor 215 may rotate the pinion 205 as desired to move the track bar 50 and nozzle away or towards the central axis. Actuator 215 may be hydraulically and/or electrically driven. Preferably, the top and bottom axial actuation mechanisms 200 operate simultaneously to avoid skewing the track bar 50. The range of adjustability for the nozzle away from and towards the central axis may depend on the vessel sizes the system is design for, as such a wide range of adjustability is possible. In some embodiments, adjustability for the nozzle away from and towards the central axis may range from 0-24 inches.

While the embodiments shown provide top and bottom axial actuation mechanisms 200, other embodiment may involve different arrangements of axial actuation mechanism. As a nonlimiting example, another embodiment may incorporate an axial actuation mechanism 200 with the main body 105 of nozzle assembly 30 to allow the nozzle 100 to be axially adjusted. It should be noted this alternative embodiment would not require axial movement of the track bar 50 and main body 105, and could simply allow actuation of the nozzle 100.

FIGS. 8-11 also show various views of top 20 and bottom 40 assemblies. Each of the top 20 and bottom assemblies may provide securing mechanism(s) for securing the system 10 in a desired vessel, such as two or more extension arms 70 that may extend axially towards or away from the central axis. The extension arms 70 are utilized to secure the system 10 in a vessel when desired, and to release the system from the vessel when desired. Two or more extension arms 70 are preferred to allow the system to be properly secured, and more preferably three extension arms. An extension mechanism (not shown) may control extension and retraction of the extension arms 70. The extension mechanism may be implemented in a variety of ways and may comprise any suitable known components, such as gearing, guide(s), actuator(s), motor(s), belt(s), chain(s), sprocket(s), hydraulic actuator(s), and/or the like. As a nonlimiting example, extension arms 70 may provide teeth, like a rack, and a pinion and actuator(s) (such as an electric or hydraulic motor) may also be provided by the housing of the top 20 and/or bottom 40 assemblies, thereby allowing control in a similar manner as the linear or axial actuation mechanisms. The range adjustability of extension arms 70 along the central axis may depend on the vessel sizes the system is design for, as such a wide range of adjustability is possible. In some embodiments, adjustability of extension arms 70 along the central axis may range from 0-30 inches.

While the embodiments shown illustrate simple extension arms 70, it may be desirable to provide more complex arms that allow the entire system 10 to move along a z-axis. As a nonlimiting example, motorized wheel(s) may be provided by the extension arms 70 that allow the entire system 10 to be moved along the z-axis. For example, in a lengthy vessel, such as a long tubular, such features may be desirable to avoid the need to repeatedly engage-disengage extension arms to traverse sections of the vessel. It should be noted that the z-axis referring to the central axis of the system 10 does not indicate orientation of a vessel. In other words, the system 10 may be utilized for removal of refractory from vertical or horizontal vessels. For example, the system 10 may be placed in a lengthy horizontal vessel, and after removal of refractory from a first section—the motorized wheels may move the system to a next section.

Figure 2:
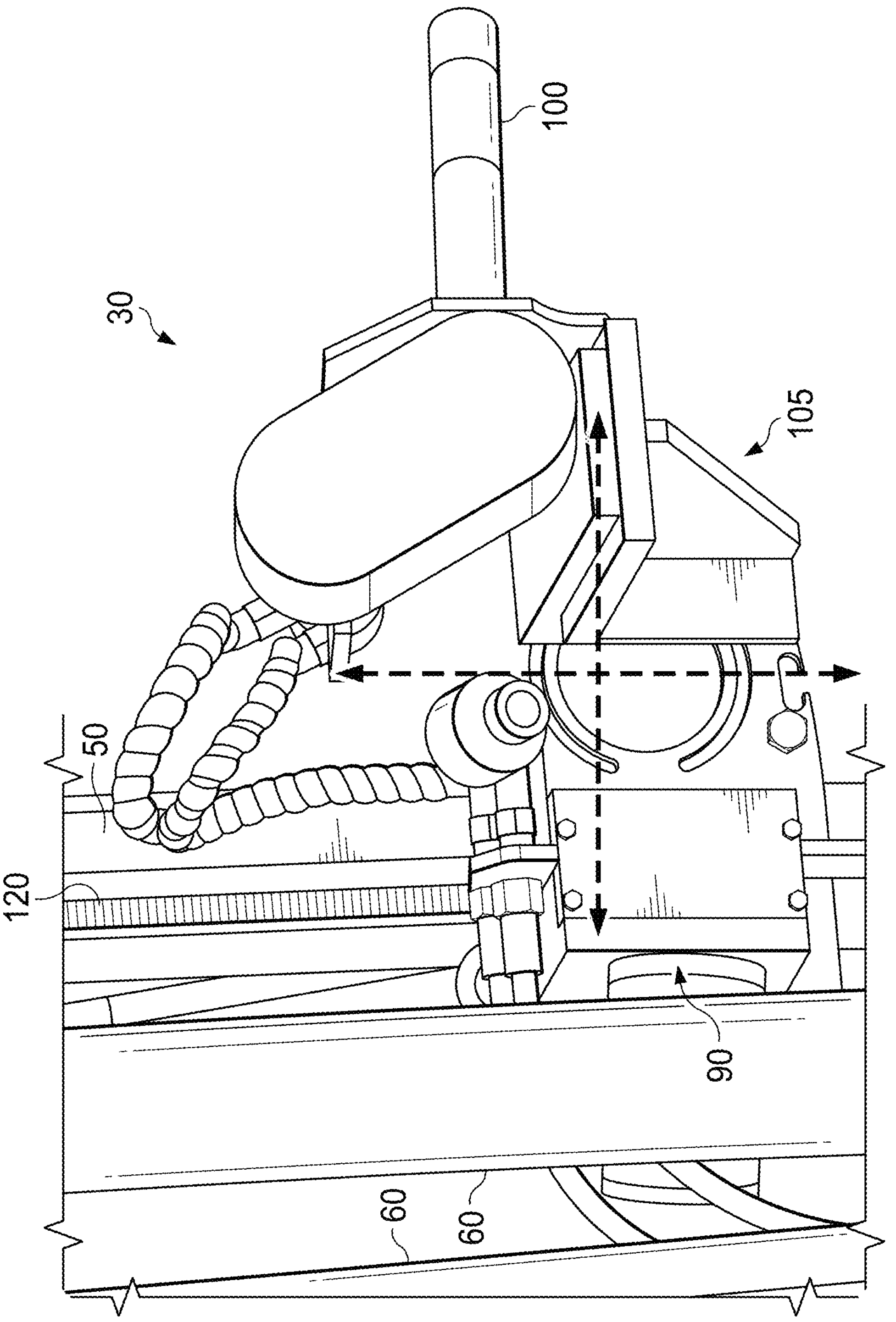
FIG. 2 shows a view of embodiments of a nozzle assembly.
Figure 3:
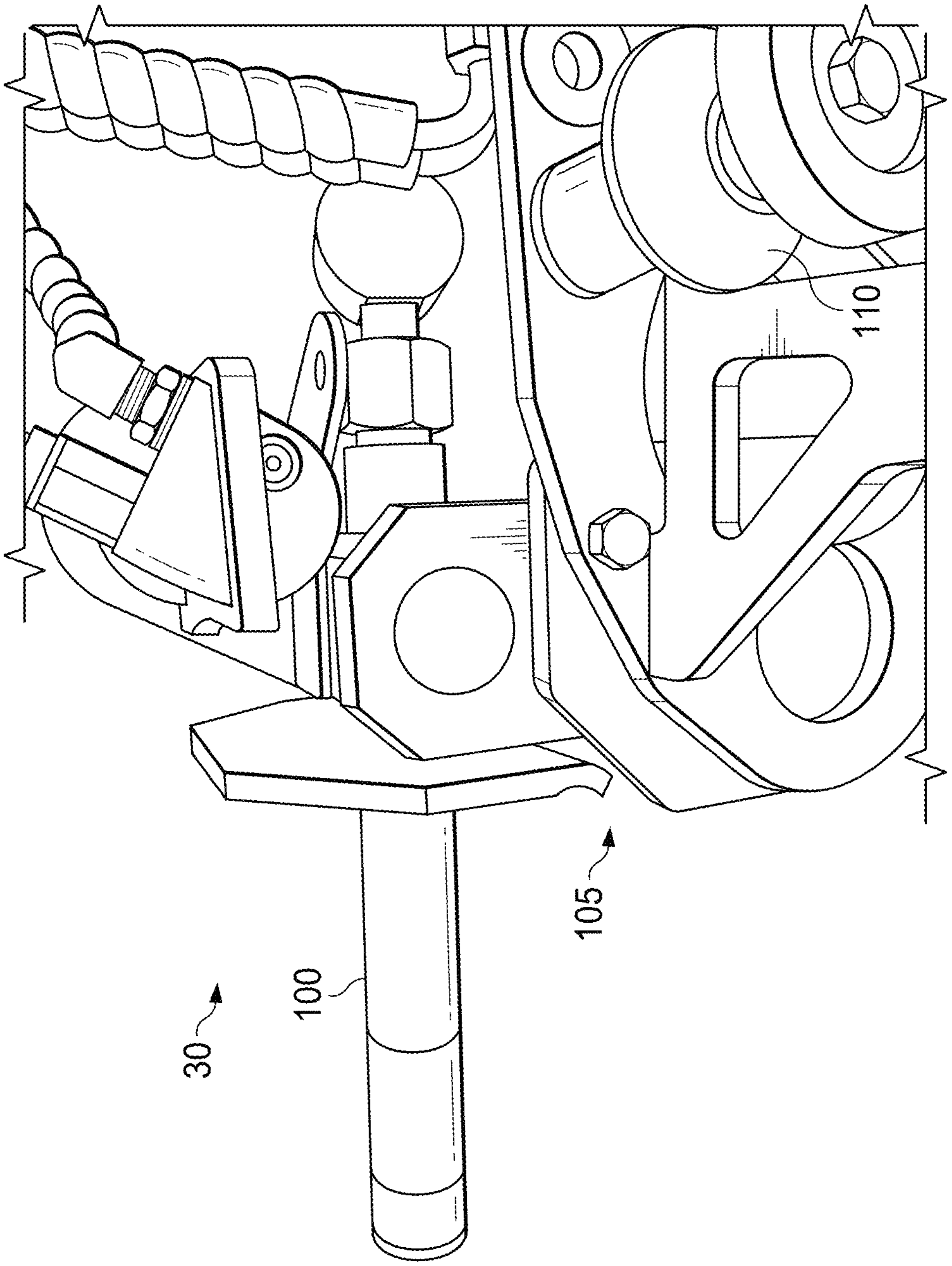
FIG. 3 shows another view of embodiments of the nozzle assembly.
Figure 4:
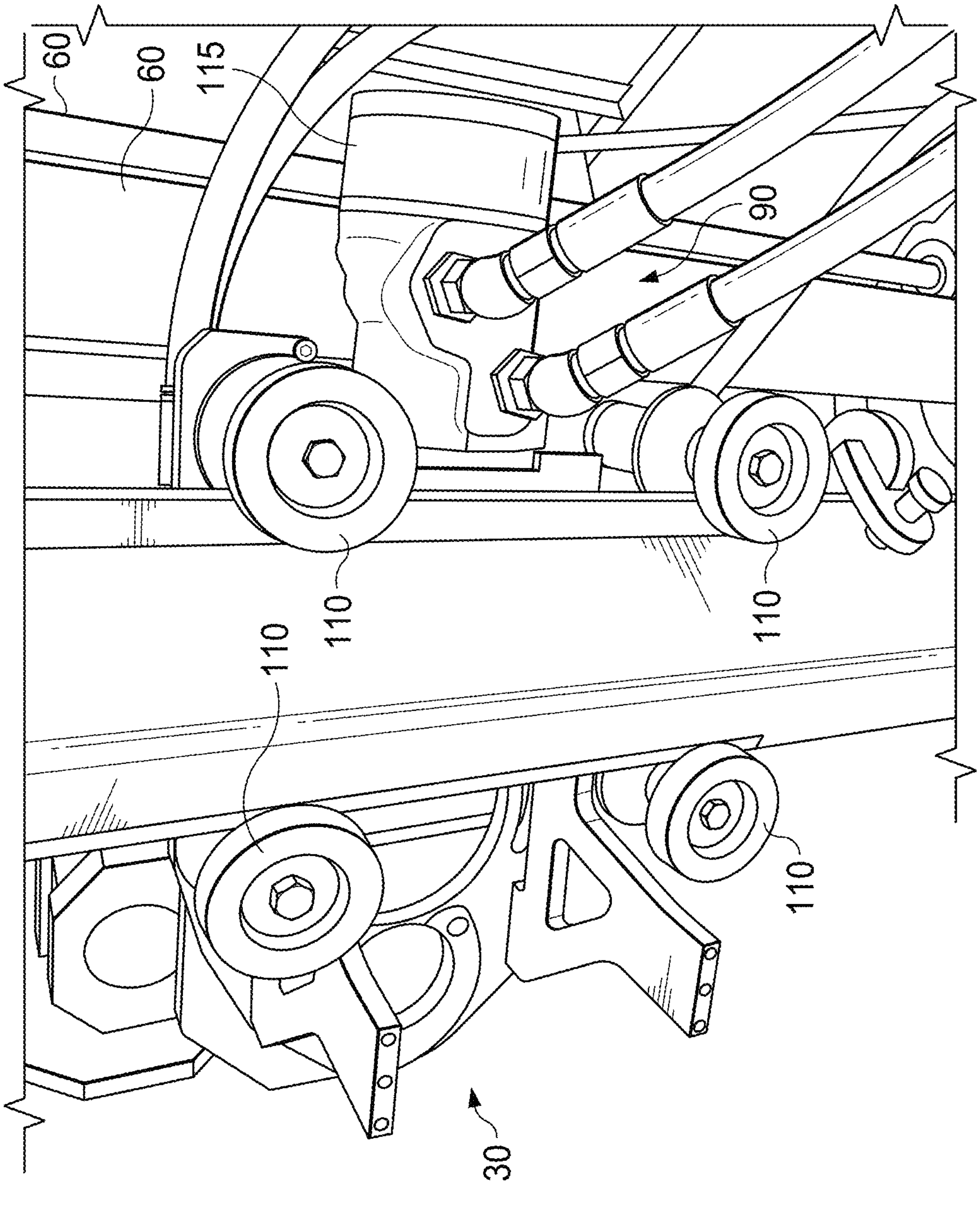
FIG. 4 shows another view of embodiments of the nozzle assembly.
Figure 5:
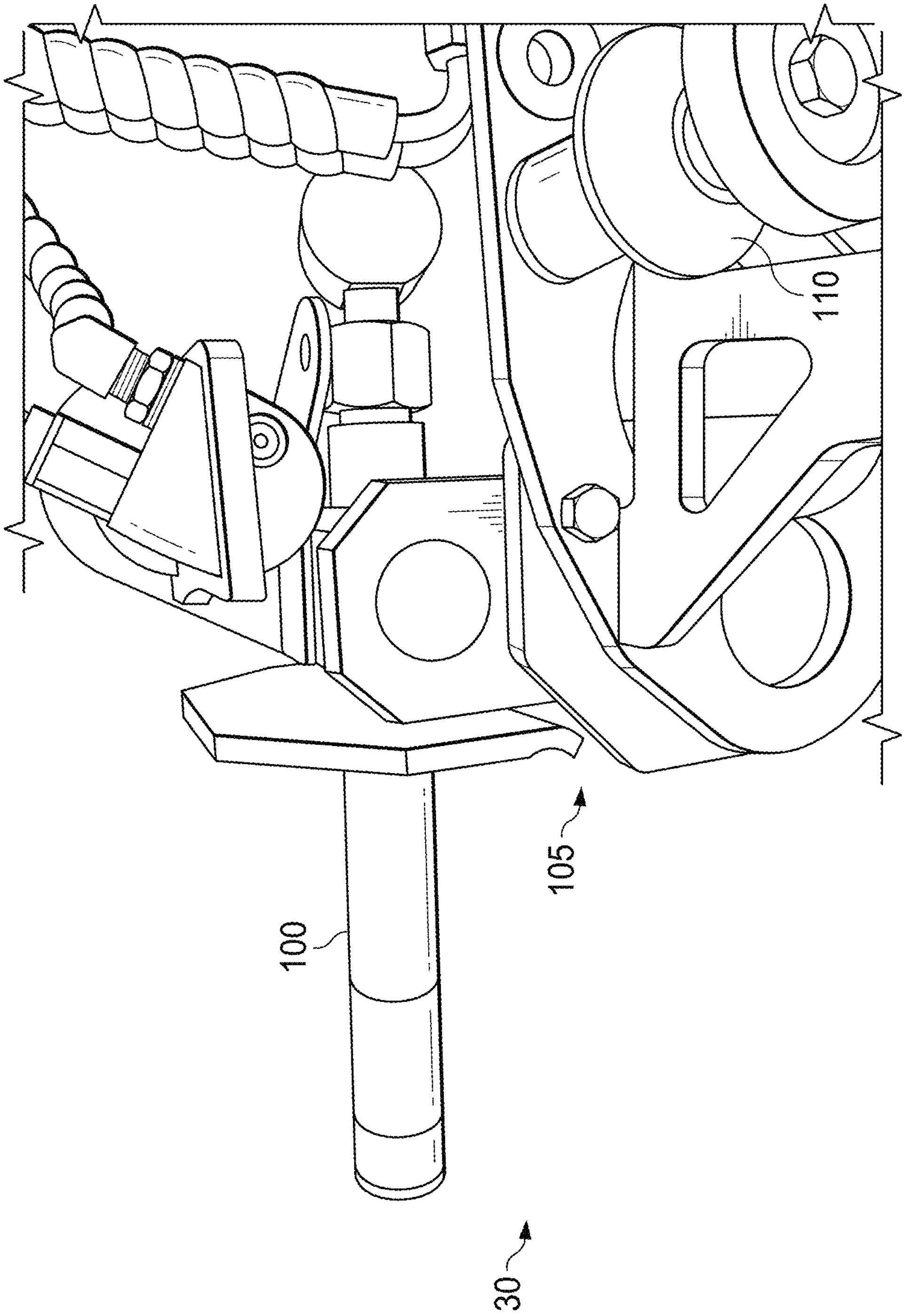
FIG. 5 shows another view of embodiments of the nozzle assembly.
Figure 6:
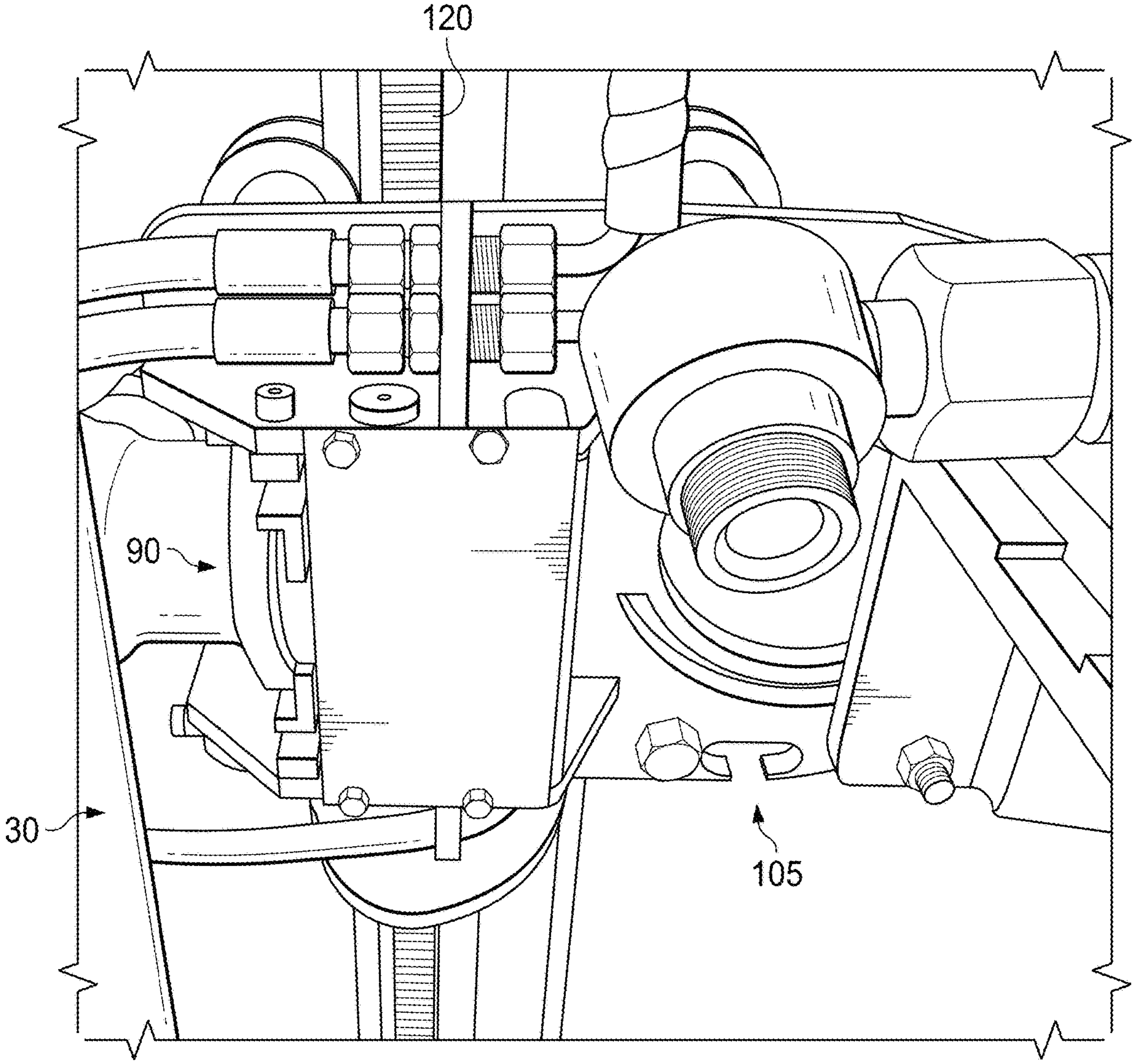
FIG. 6 shows another view of embodiments of the nozzle assembly.
Figure 7:
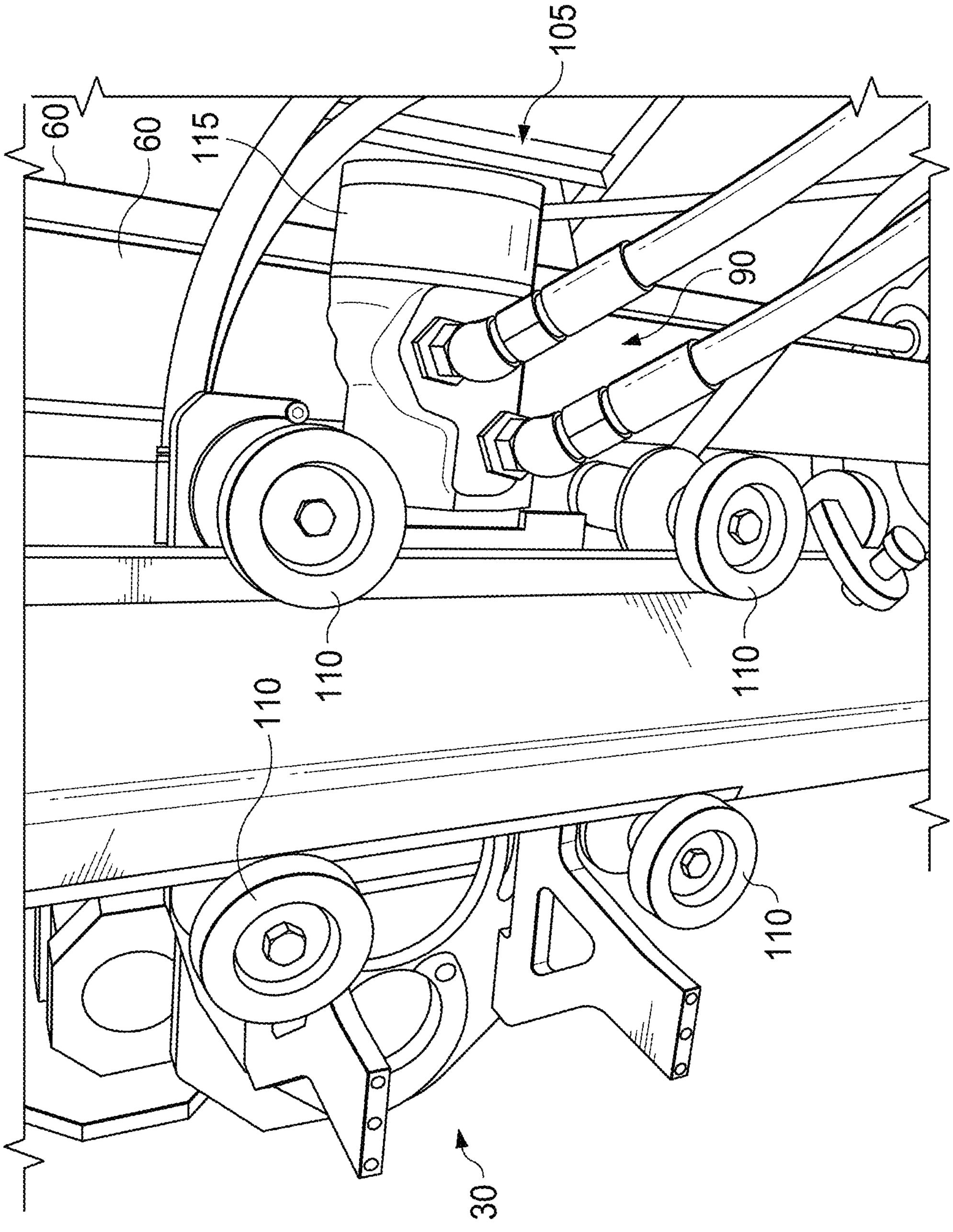
FIG. 7 shows another view of embodiments of the nozzle assembly.
Figure 8:
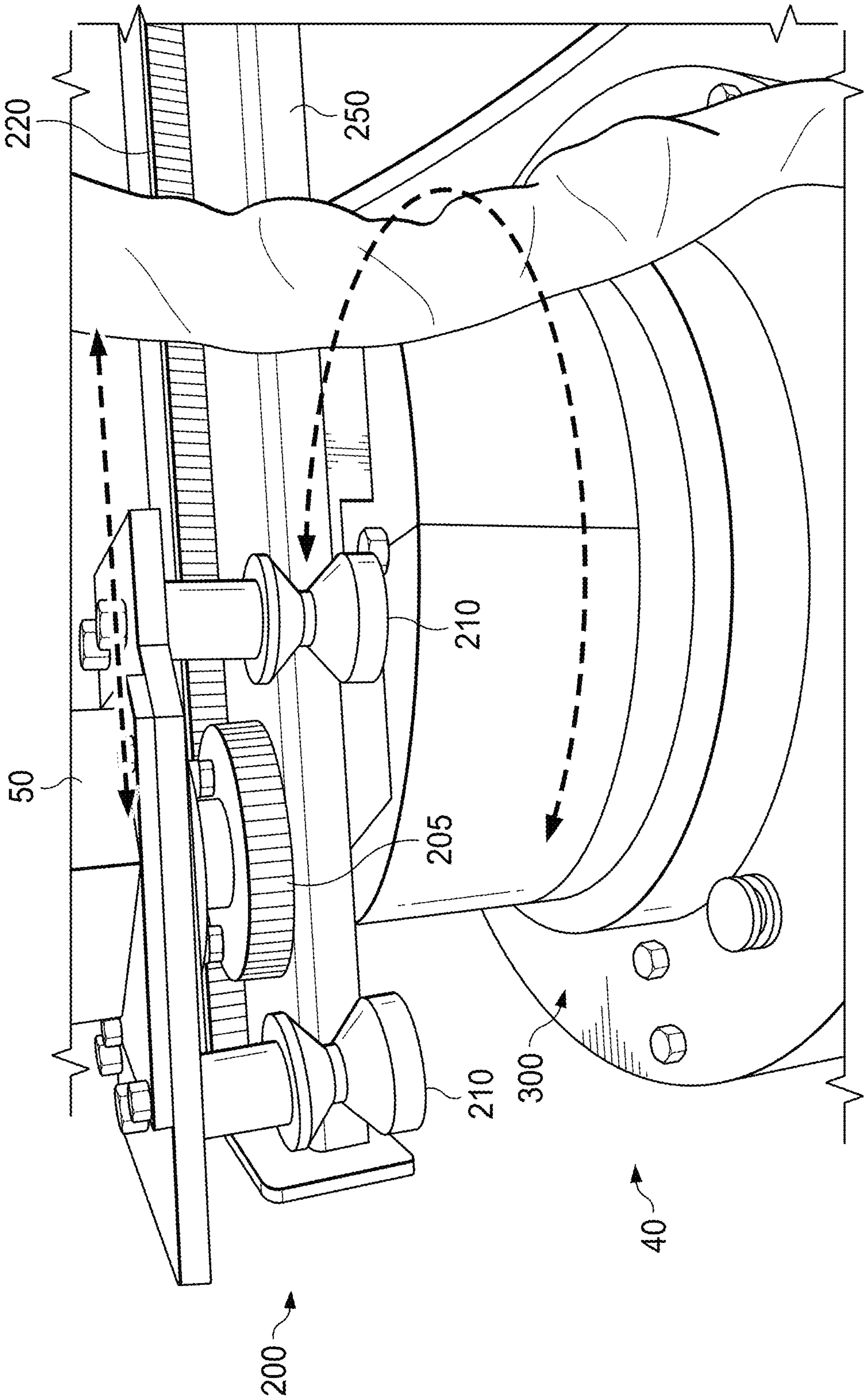
FIG. 8 shows a view of embodiments of the nozzle assembly and bottom assembly.
Figure 9:
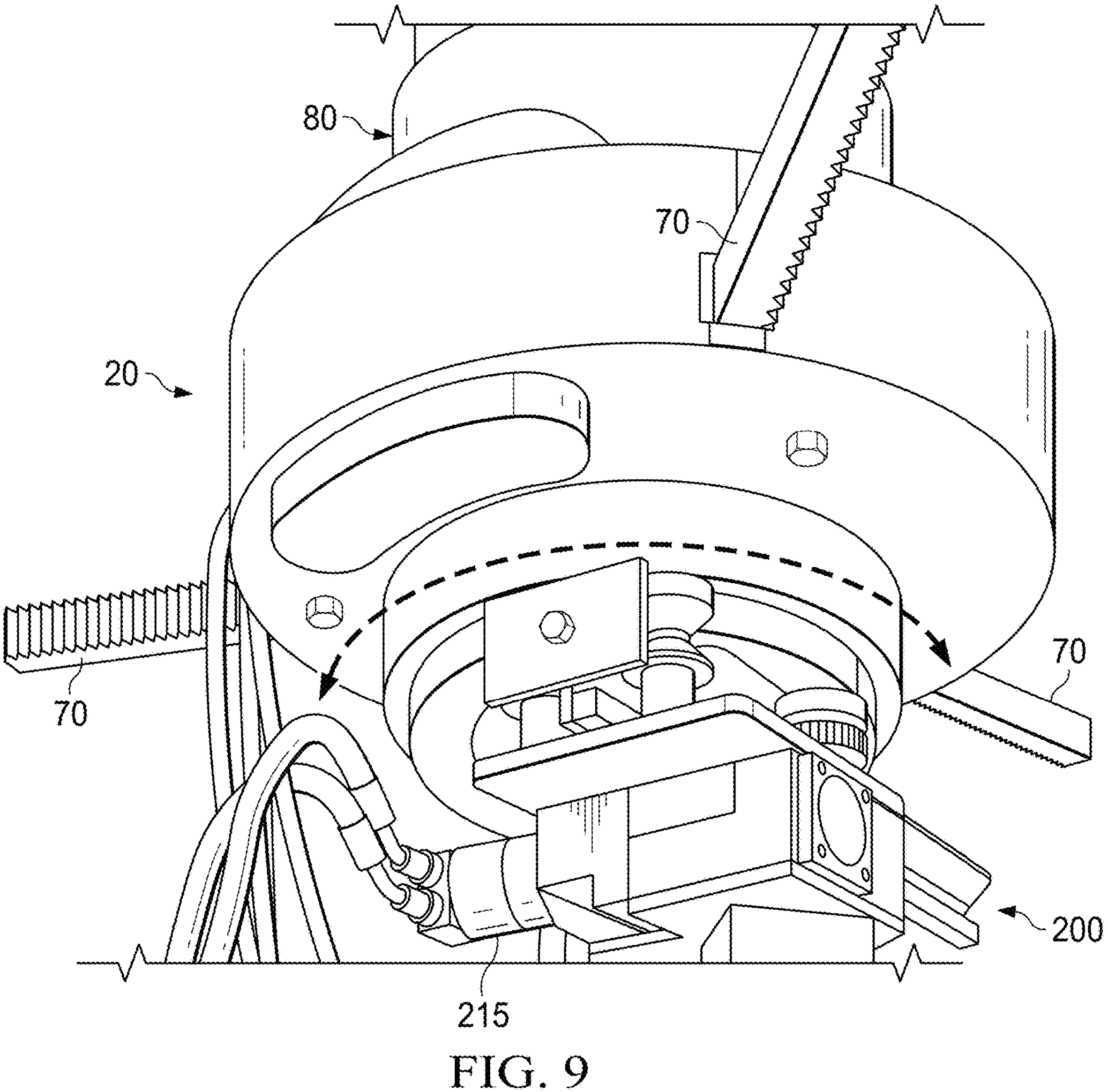
FIG. 9 shows a view of embodiments of the nozzle assembly and top assembly.
Figure 10:
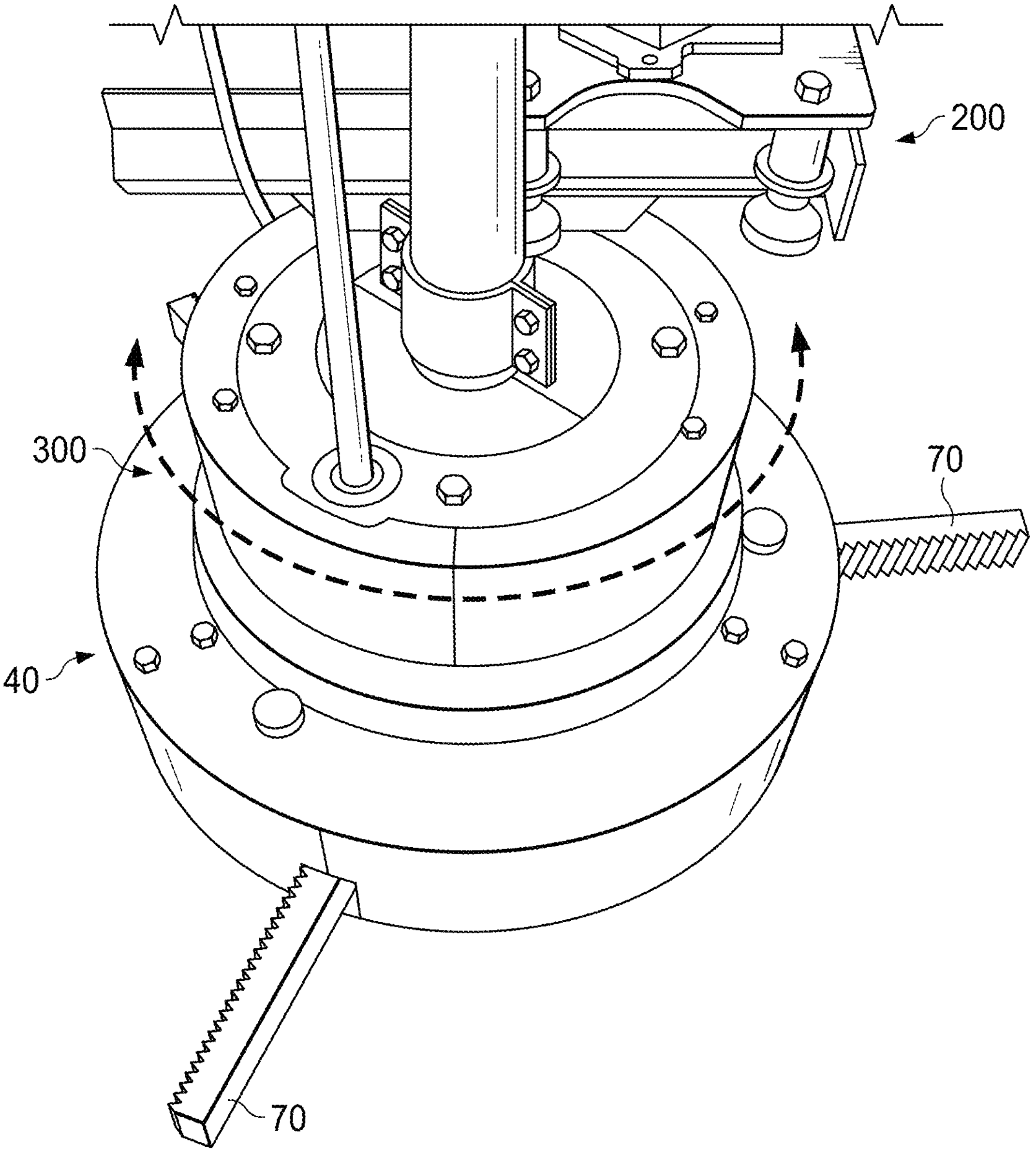
FIG. 10 shows another view of embodiments of the nozzle assembly and bottom assembly.
Figure 11:
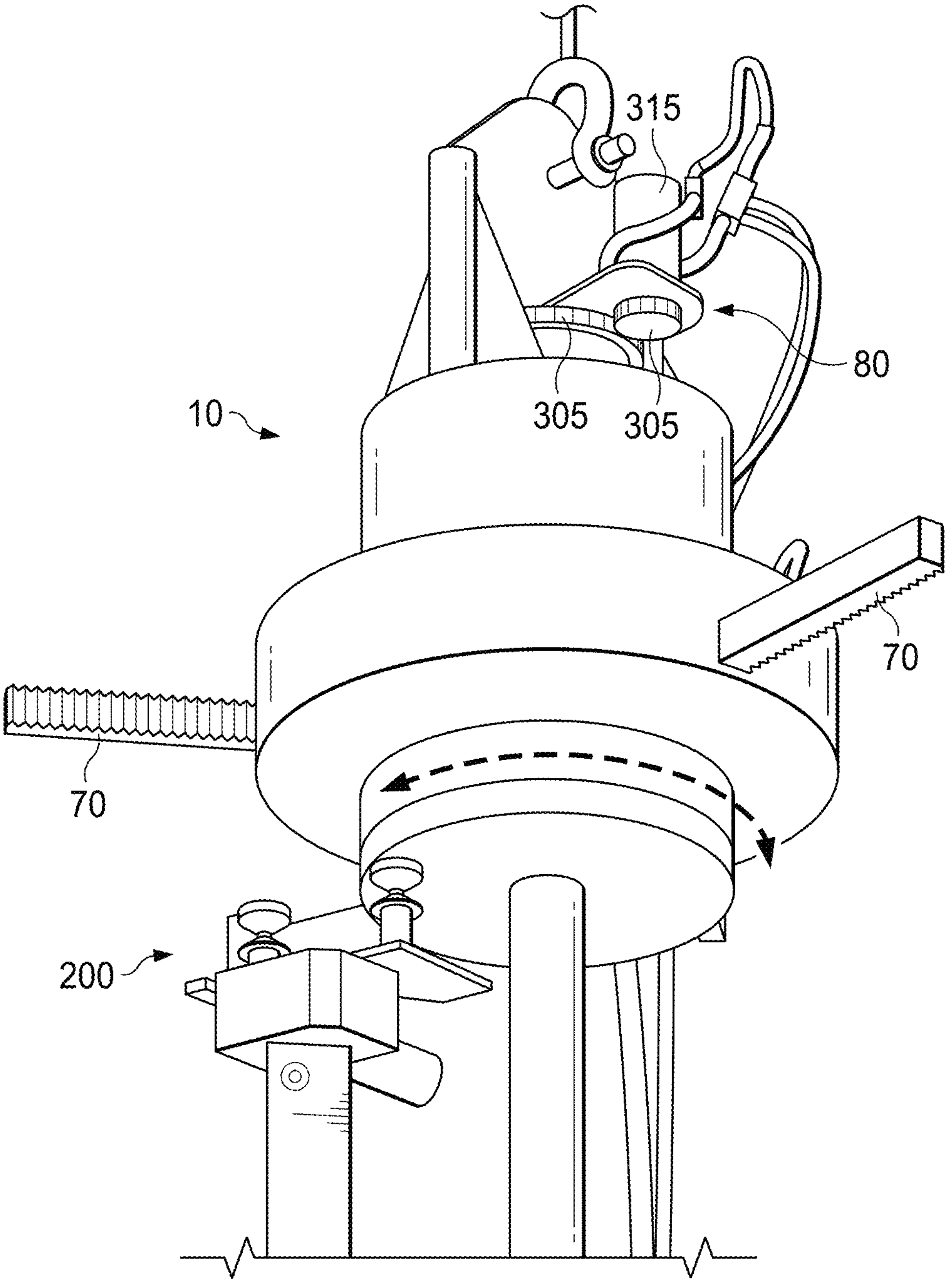
FIG. 11 shows another view of embodiments of the nozzle assembly and top assembly.

In addition to allowing a nozzle 100 to be moved up or down along the central axis or axis of rotation and away or towards the central axis, it is also desirable to allow the nozzle to be rotated about the central axis (e.g. FIG. 2). One or more of the top 20 or bottom 40 assemblies may provide a rotation mechanism 80 that allows the nozzle 100 to be rotated about the central axis or the axis of rotation. In some embodiment, the rotation mechanism 80 may allow the nozzle 100 to be rotated 360° or greater around the central axis. Preferably, rotation of the rotation mechanism 80 is limited, such as to about 360°, to prevent hydraulic or electric lines connected to rotating parts from wrapping around the system 10. However, some embodiments may route lines in a manner that avoid such issues.

The rotation mechanism 80 may be implemented in a variety of ways and may comprise any suitable known components, such as gearing, guide(s), actuator(s), motor(s), belt(s), chain(s), sprocket(s), hydraulic actuator(s), and/or the like. As a nonlimiting example, the rotation mechanism 80 may comprise a gearing system 305 and actuators 315 that cause the nozzle 100 to rotate clockwise or counter-clockwise as desired (e.g. FIG. 11). In alterative embodiments, the rotary mechanism 80 may comprise a sprocket driven by a motor to move a belt or chain causing rotation of the nozzle 100. As it may be desirable for bottom assembly 40 (or top assembly 20 in alternative embodiments) to remain stationary when the nozzle 100 rotates, a bearing mechanism 300 may be desirable for the bottom assembly. The bearing mechanism 300 may provide bushings, bearings, or the like that allow the nozzle 100 or nozzle assembly 30 to rotate freely relative to the bottom assembly 40. In other embodiments, it may be desirable to substitute the bearing mechanism 300 with a rotary mechanism 80. In the embodiments shown, various elements rotate with the nozzle 100 as well—such as the nozzle assembly 30, track bar 50, support bars 60, linear actuation mechanism 90, and axial actuation mechanism(s) 200.

It shall be apparent to one of ordinary skill in the art that variations of the embodiments above are possible to accommodate a variety of different situations. Variations in refractory vessel shapes and/or sizes may make variations of the system or size of the system desirable to accommodate the different variations.

Figure 12:
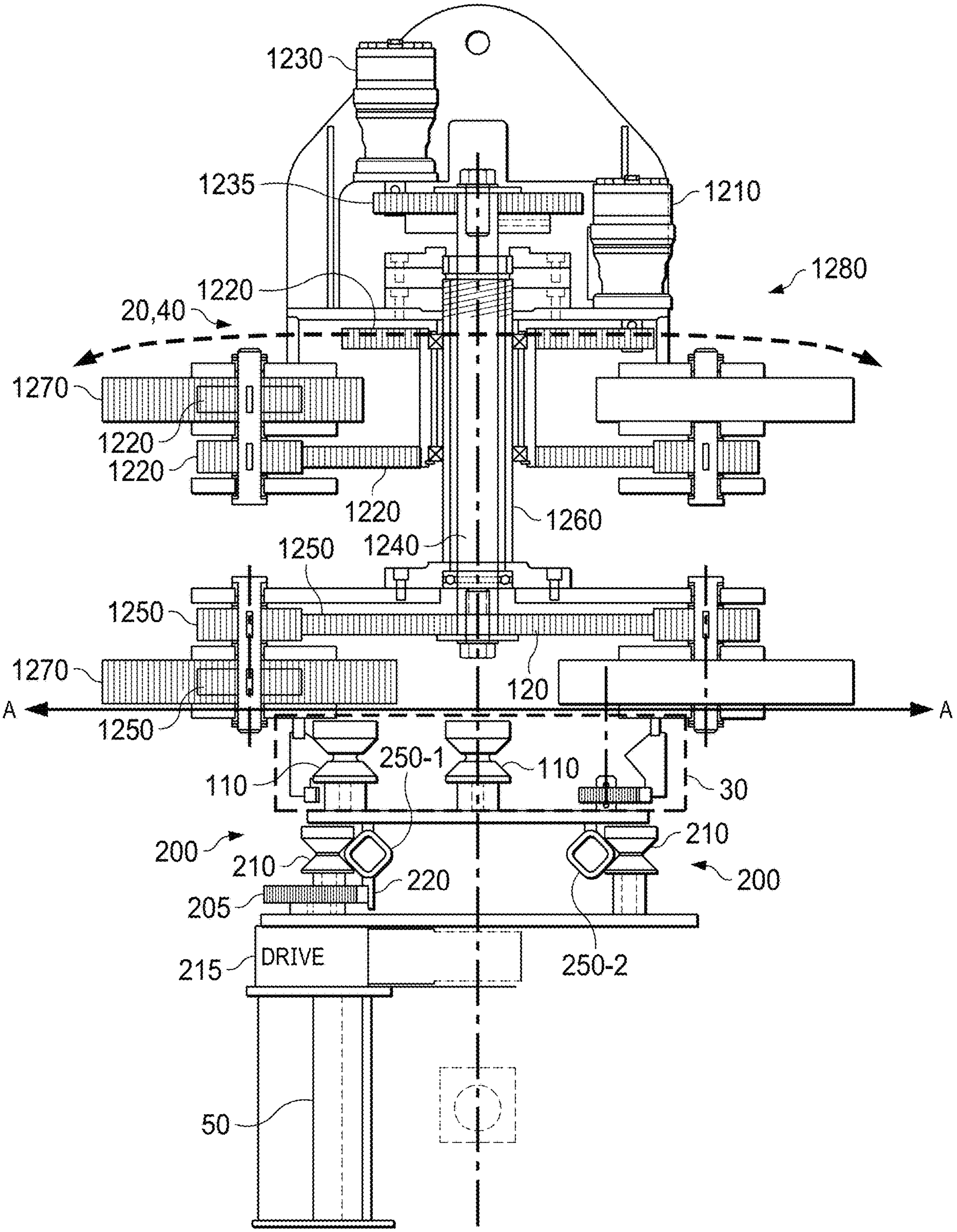
FIG. 12 shows yet another embodiment of a refractory removal system.

FIG. 12 shows yet another embodiment of a refractory removal system. Prior discussion of various assemblies or components of the embodiments above are incorporated by reference herein, as they may be arranged or operate in a similar manner. While somewhat similar to prior embodiments discussed above, this new embodiment does not position the rotating (top and bottom) assemblies at the extreme opposite ends of the system. Rather, rotating assemblies 20, 40 are either placed near one end or combined, such as but not limited to a top end of the system. This shall be referred to herein as the assembly 20, 40, and it shall be recognized alternative design may utilize either a combined assembly or single top or bottom assembly. Similar to the prior embodiments, a rotation mechanism 1280 is provided for rotating the nozzle or nozzle assembly about the central axis (not shown). In some embodiments, the rotation mechanism provides an actuator 1230 that is coupled to a gearing system 1235 that causes rotation of drive shaft 1240 and the nozzle or nozzle assembly. As with the prior embodiment, the rotation mechanism 1280 allows rotation of nozzle or nozzle assembly relative stationary components, particularly the top portion of the system of FIG. 12. In the nonlimiting example shown, the assembly 20, 40 also provides extension mechanism(s) that may further and optionally include an additional actuator 1210, gearing 1220, further gearing 1250, and extension arms 1270. It shall be apparent to one of ordinary skill that the drive shaft 1240 is rotationally decoupled from surrounding outer tubing 1260 or shaft 1240 and tubing 1260 do not rotate together. As discussed previously, other embodiments of the rotation mechanism 1280 may provide any suitable known components, such as gearing, guide(s), actuator(s), motor(s), belt(s), chain(s), sprocket(s), hydraulic actuator(s), and/or the like.

Shown in FIG. 12 in the box illustrated in dashed lines, this embodiment may also provide a nozzle assembly, linear actuation mechanism 90, and various associated components similar to the prior embodiment discussed above positioned on the track bar 50 and operating in a similar manner (e.g. rack, pinion, main body, guides, actuator, etc.). It should be noted the linear actuation mechanism 90 is illustrated in the dashed box for convenience, but is positioned on track bar 50 in a similar manner as shown in FIGS. 2-7. Guides 110 secure the nozzle assembly (not shown) to track bar 50. Rack and pinion 120 allow the nozzle (not shown) and nozzle assembly to be moved up and down along the track bar 50 due the rack. As discussed previously, the linear actuation mechanism is not limited to the particular arrangement shown and may be implemented in a variety of ways and may comprise any suitable components, such as gearing, guide(s), actuator(s), motor(s), belt(s), chain(s), sprocket(s), hydraulic actuator(s), and/or the like. In some embodiments, the length of the track bar 50, and consequently adjustability the nozzle/nozzle assembly up and down along track bar, may include the prior ranges discussed or may alternatively be shortened to benefit stability. As a nonlimiting example, adjustability for the nozzle up and down along the central axis may range from 0 to 4 feet or 0 to 2 feet.

Similar to the prior embodiment, an axial actuation mechanism 200 may be place near one end adjacent to the assembly 20, such as but not limited to a bottom end of assembly 20. The notable difference in the embodiment of FIG. 12 is that two axial actuation mechanisms are not needed at both ends. As in the prior embodiment, the axial actuation mechanism 200 may be implemented in a variety of ways and may comprise any suitable known components, such as gearing, guide(s), actuator(s), motor(s), belt(s), chain(s), sprocket(s), hydraulic actuator(s), and/or the like. In the nonlimiting embodiment shown, the axial actuation mechanism 200 may provide guide(s) 210, actuator(s) 215, gearing or a rack 220 and pinion 205, and axial bar(s) 250-1, 250-2. Actuation mechanism 200 may provide an axial bar 250-1 with a rack 220 guiding movement towards or away from the central axis (e.g. into and out of the page in the view shown, though it will be recognized this changes when the system is rotated to a different position). In the embodiment shown, the axial bar 250-1 and rack 220 (left) are coupled to the pinion 205 driven by actuator 215. As in the prior embodiments discussed above, the axial bar 250-1 is coupled to the top assembly 20 and track bar 50. However, the embodiment of FIG. 12 includes an additional axial bar 250-2 (right) that provides added stability for the track bar 50 below. Additional axial bar 250-2 is positioned parallel to axial bar 250-1 to minimize or prevent twisting or rotation left and right of the track bar 50 relative to the system in view shown. Further, components of the axial actuation mechanism 200 rotate with the nozzle or nozzle assembly and track bar 50 (relative to top portions of assemblies 20, 40). Guides 210 at opposing ends couple the track bar 50 the axial bars 250-1, 250-2. It should be noted the two axial bar arrangement provides added stability over a single axial bar arrangement to prevent or minimize twisting about the axial bar.

Figure 13:
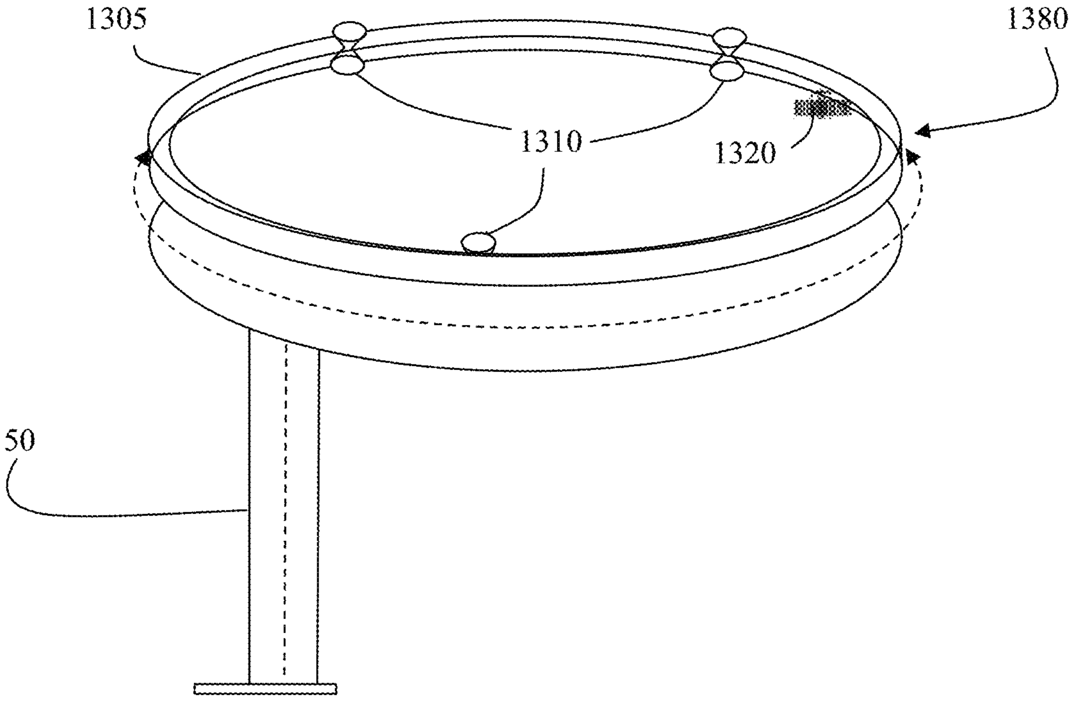
FIG. 13 shows yet another embodiment of a rotation mechanism 1280 for a refractory removal system

FIG. 13 shows yet another embodiment of a rotation mechanism 1280 for a refractory removal system. A refractory removal system may be similar to FIG. 12 above line AA and as discussed above. However, an alternative rotation mechanism 1380 may be substituted below line AA shown in FIG. 13. A ring 1305 may be provided with a V-shaped profile on the inner diameter surface. Guides 1310 corresponding V-shapes profiles that mate to the inner diameter of the ring 1305. It shall be apparent the guides 1310 may act as rollers, similar to guides 110 discussed previously above, that allow rotation about the ring. While three guides 1310 are shown, other embodiments may use two, four, or more. Ring 1305 may also provide a ring-shaped rack with teeth mating to pinion 1320 that allows the ring to rotate relative to the guides or vice versa. In some embodiments, ring 1305, pinion 1320, and guides 1310 may be secured to assemblies or mechanisms above line AA, or alternatively to assemblies or mechanisms below line AA. However, guides 1310 and pinion 1320 are preferably secured common upper or lower assemblies/mechanisms, whereas the ring 1305 shall be secured to an opposing assembly/mechanism to allow rotation relative to the guides & pinion. As a nonlimiting example, freely guides 1310 and pinion 1320 may be secured to an upper portion (keeping them stationary relative to the upper portion), whereas the ring 1305 is secured to a lower portion that is desirable to rotate. As the pinion 1320 rotates, it causes the ring 1305 and the lower portion to rotate, including track bar 50 and the nozzle/nozzle assembly (not shown). An opposite arrangement where ring 1305 is secured to upper portion, and guides 1310 and pinion 1320 are secured to the lower portion may also be contemplated as well. Though an axial mechanism is not shown, it may also be provided below line AA.

Whereas the embodiments above may desire a longer track bar, these embodiments may desire a shorter track bar 50 in some cases to minimize concerns about flexing, stability, or damage. Nonlimiting examples may provide a track bar 50 or a range of motion up/down along the track bar of about 4 feet. As the bottom end of track bar 50 does not require a rotating mechanism or bearing, a stopper or the like may be provided to stop a nozzle assembly (not shown) from disengaging from the system. While the nozzle assembly is not shown, it is similar to those discussed in embodiments above and may comprise any combination of components discussed previously above.

EXPERIMENTAL EXAMPLE

The following examples are included to demonstrate particular aspects of the present disclosure. It should be appreciated by those of ordinary skill in the art that the methods described in the examples that follow merely represent illustrative embodiments of the disclosure. Those of ordinary skill in the art should, in light of the present disclosure, appreciate that many changes can be made in the specific embodiments described and still obtain a like or similar result without departing from the spirit and scope of the present disclosure.

The embodiments shown in FIGS. 1-12 represent prototypes built and/or tested. The tested prototype has shown positive results in removing refractory from vessels, especially cylindrically shaped vessels.

Embodiments described herein are included to demonstrate particular aspects of the present disclosure. It should be appreciated by those of skill in the art that the embodiments described herein merely represent exemplary embodiments of the disclosure. Those of ordinary skill in the art should, in light of the present disclosure, appreciate that many changes can be made in the specific embodiments described, including various combinations of the different elements, assemblies, components, steps, features, or the like of the embodiments described, and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure.

What is claimed is:

1. A refractory removal system for removing refractory materials from a target vessel, the system comprising:

a top or bottom assembly that allows the refractory removal system to be placed in the target vessel at a desired position, the top or bottom assembly provides a securing mechanism, wherein the securing mechanism provides two or more arms;

a nozzle assembly coupled to the top or bottom assembly, wherein the nozzle assembly provides a nozzle for hydrodemolition;

a linear actuator mechanism that allows the nozzle to be moved vertically along a central axis;

a rotation mechanism that allows the nozzle to be rotated 360° or greater about the central axis; and an axial actuation mechanism that allows the nozzle to be moved away or towards the central axis, wherein the axial actuation mechanism is secured to an end of a track bar, and the axial actuation mechanism provides a rack and pinion and an axial actuator.

2. The system of claim 1, wherein the nozzle is movable away from or towards the central axis in a range from 0 to 24 inches.

3. The system of claim 1, wherein the linear actuator mechanism comprises:

a track bar providing a rack; and a pinion, wherein the pinion is rotated to allow the nozzle to move up and down along the rack.

4. The system of claim 1, wherein the nozzle is movable up and down along the central axis from a range of 0 to 5 feet or 0 to 8 feet.

5. The system of claim 3, wherein the system provides both the top assembly and the bottom assembly, and the nozzle assembly separates the top assembly and the bottom assembly.

6. The system of claim 1, wherein the two or more arms are extendable towards or away from the central axis, and the two or more arms provide wheels.

7. The system of claim 6, wherein the two are more arms are adjustable to further extend in a range from 0-30 inches.

8. The system of claim 6, wherein the wheels are motorized, and an extension mechanism controls the two or more arms, wherein the extension mechanism includes gearing, guide(s), actuator(s), motor(s), belt(s), chain(s), sprocket(s), hydraulic, or actuator(s).

9. The system of claim 5 further comprising:

a support bar separating the top assembly and the bottom assembly; and wherein further the nozzle is secured to a main body that is movably coupled to the track bar separating the top assembly and the bottom assembly.

10. The system of claim 9 further comprising an axial actuation mechanism incorporated with the main body of the nozzle assembly to allow the nozzle to be axially adjusted.

11. The system of claim 9, wherein the main body is secured to the track bar by guides, and the guides keep the rack and pinion engaged; and the linear actuator mechanism further comprises a linear actuator coupled to the pinion, wherein the linear actuator is rotatable to move the main body up or down.

12. The system of claim 1, wherein the rotation mechanism comprises gearing, guide(s), actuator(s), motor(s), belt (s), chain(s), sprocket(s), or hydraulic actuator(s).

13. The system of claim 12, wherein the rotating mechanism is provided by the top or bottom assembly.

14. The system of claim 13, wherein the system provides both the top assembly and the bottom assembly separated by the nozzle assembly, and the rotating mechanism is provided by the top assembly or the bottom assembly.

15. The system of claim 14 further comprising a bearing mechanism provided opposite the rotating mechanism of the top assembly or the bottom assembly that allows the nozzle assembly to rotate.

16. The system of claim 1, wherein the system provide a pitch and/or roll adjustment for the nozzle.

17. The system of claim 1 further comprising:

an axial actuation mechanism that allows the nozzle to be moved away or towards the central axis, the axial actuation mechanism is secured to an end of a track bar and the top or bottom assembly, the axial actuation mechanism comprising a first axial bar coupled to a rack, wherein the rack is engaged to an axial pinion coupled to an axial actuator.

18. The system of claim 17, wherein the axial actuation mechanism further comprises a second axial bar positioned parallel to the first axial bar.

* * * * *